United States Patent [19]

Kavehrad et al.

[11] Patent Number: 5,181,136
[45] Date of Patent: Jan. 19, 1993

[54] OPTICAL HOMODYNE DPSK RECEIVER WITH OPTICAL AMPLIFIER

[75] Inventors: Mohsen Kavehrad, Cumberland, Canada; Mansour I. Irshid, Ibrid, Jordan

[73] Assignee: The University of Ottawa, Ottawa, Canada

[21] Appl. No.: 586,132

[22] Filed: Sep. 20, 1990

[30] Foreign Application Priority Data

Sep. 22, 1989 [CA] Canada .................... 6126855

[51] Int. Cl.⁵ .......................... H04B 10/06
[52] U.S. Cl. .................... 359/190; 359/189
[58] Field of Search ............ 359/190, 191, 189, 154, 359/183; 375/84, 102; 455/324

[56] References Cited

U.S. PATENT DOCUMENTS 4,817,207  3/1989  Smith et al. ............... 359/183
4,829,598  5/1989  Auracher et al. ........... 359/191
5,056,122  10/1991  Price ....................... 375/84

OTHER PUBLICATIONS

Demodulation of Optical DPSK Using In-Phase and Quadrature Detection, Hodgkinson et al, Jul. 1985.

Primary Examiner—Edward L. Coles, Sr.
Assistant Examiner—Kinfe-Michael Negash
Attorney, Agent, or Firm—Spencer, Frank & Schneider

[57] ABSTRACT

An optical homodyne differential phase shift keying (DPSK) receiver for receiving and demodulating optical input signals, is provided with a power splitter for splitting the input signal into first and second signals, a delay is applied to the second signal, an optical amplifier optically amplifies the delayed second signal, and a balanced noise reduction circuit combines the first signal and the delayed amplified second signal to produce a demodulated output signal.

20 Claims, 4 Drawing Sheets

OPTICAL HOMODYNE DPSK RECEIVER WITH OPTICAL AMPLIFIER

BACKGROUND OF THE INVENTION

1. Field of the Invention

The present invention relates to the field of optical signal reception and demodulation. In particular, the present invention relates to a novel optical homodyne DPSK receiver. The present invention also provides a novel noise reduction circuit for use in association with the receiver of the present invention but which will, undoubtedly, find many other obvious uses.

2. Background Information

When transmitting and receiving a signal over an optical fibre network, only very small error probabilities in signal demodulation are considered acceptable. For instance, in relation to voice transmission, an error probability of one in a thousand is considered acceptable. However, in data transmission, an error probability of one in one hundred million at most is desired. Accordingly, it will be understood that it is greatly desired to reduce background noise in an optical receiver.

One method used for efficient reception, with low noise, is known as DPSK—Differential Phase Shift Keying. It has been found, however, as reported by J. Salz in "Modulation and Detection for Coherent Lightwave Communications"—Jun., 1986, *Telecommunications Magazine*, that the conventional method of decreasing error probability, by raising signal strength, is strictly limited in DPSK signal processing. This is because the ratio of penalty in dB to signaling rate/laser linewidth becomes infinite at values of signaling rate/laser linewidth approaching 200.

In a DPSK system, the modulation process is similar to that of a Phase Shift Keying (PSK) system, except that binary data are differentially encoded before application to an optical modulator. Therefore data are conveyed by the difference in the carrier phase in two consecutive bit intervals each shown by T. On the receiver side, the received optical signal in a particular bit interval, say $k^{th}$ bit interval, is presented as $$E(t) = \sqrt{2P_s} \ a_k \cos[\omega_0 t + \theta(t)] \ 0 \leq t \leq T \quad (1)$$

where $P_s$ denotes the received optical power; $a_k$ is a data bit representing a "+1" or a "−1"; $\omega_o$ is the angular optical carrier frequency and $\theta(t)$ is the laser phase noise.

In a conventional homodyne DPSK receiver, a received optical signal is divided between two branches; one half is delayed by T seconds, the other half is directly combined with the delayed one. Such a receiver performs well with noise-free electronic amplifiers and minimal shot noise. In practice, however, because of shot noise and thermal noise, the performance of homodyne DPSK is poor and the heterodyne version is used instead.

SUMMARY OF THE INVENTION

It is an object of the present invention, therefore, to provide an improved optical DPSK receiver.

In a broad aspect, the present invention relates to an optical homodyne differential phase shift keying (DPSK) receiver for receiving and demodulating optical signals, including input means for receiving an optical signal and transmitting the signal to a power splitting means that splits the signal into first and second signals, each of which is transmitted away from the splitter along its own optical path; delay means in the path of the second signal, to delay same and thereby produce a delayed second signal; optical amplifying means in the path of the delayed second signal to optically amplify the delayed second signal; and a balanced noise reduction circuit means receiving inputs from the paths of both the first, direct, signal and the delayed amplified second signal, for combining the first signal and the delayed amplified second signal, to produce a demodulated output signal.

BRIEF DESCRIPTION OF THE DRAWINGS

In the accompanying drawings and graphs which illustrate the present invention by way of example.

DETAILED DESCRIPTION OF THE PREFERRED EMBODIMENT

The invention will now be described in more detail by example with reference to the embodiment shown in the Figures. It should be kept in mind that the following described embodiment is only presented by way of example and should not be construed as limiting the inventive concept to any particular physical configuration.

Figure 1:
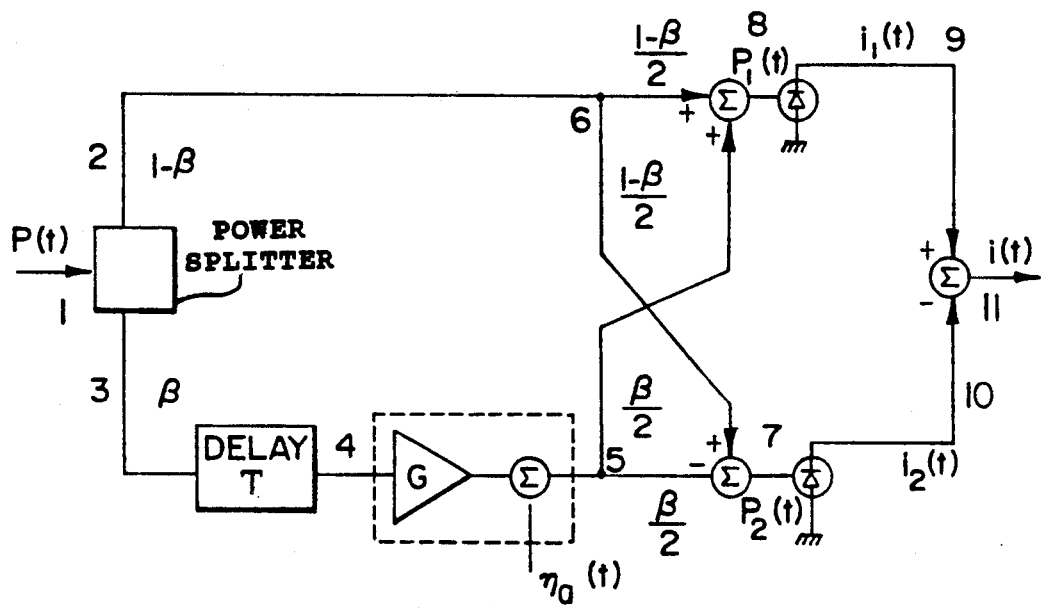
FIG. 1 is a schematic drawing of the homodyne DPSK receiver with an optical amplifier according to the present invention.

The homodyne DPSK receiver structure of an embodiment of the present invention is shown in FIG. 1, which, as indicated includes an optical amplifier noise source N$_a$(t) in the delayed signal path. The received optical signal P(t) is passed through a power splitter 1 to get a direct path 2 and a delayed path 3. Then the delayed signal in the delayed path 3 is optically amplified 4. The direct and the amplified delayed path signals are introduced to a balanced optical mixer at 5 and 6, as depicted in FIG. 1. The two branches are photodetected at 7 and 8, and the delayed branch signal 10 is subtracted from that on the direct branch 9. The resulting photocurrent 11 is free from otherwise extremely high-power noise components such as those found in a conventional receiver.

The optical amplifier shall be considered herein as an ideal noiseless amplifier of power gain G followed by an additive noise source $N_a(t)$ due to spontaneous emission which is assumed to be zero-mean Gaussian and white over the frequency band of interest.

To discuss FIG. 1 in greater detail, the power of the received optical signal is divided into two parts; a fraction $\beta$ of the power goes to the delayed path and the remaining part $(1-\beta)$ goes to the direct path, then half of the power of the delayed signal, $\beta/2$, plus and minus half of the power of the direct signal, $(1-\beta)/2$, are applied to the balanced optical mixer.

It has been determined that as long as $0.0 < \beta < 0.5$, the change in error performance is an order of magnitude. This range of $\beta$ is, therefore, preferred. For $\beta > 0.5$, unacceptable performance is achieved, as amplifier gain will be less than 1, due to the relationship, explained below, between G and $\beta$.

It will be noted that the delay element introduced into the delayed signal path is equal to one bit period. After that delay period, the signal is amplified, resulting in amplification of noise as well. It is therefore necessary to remove, to as great a degree as possible, the squared noise, so a novel balanced receiver is introduced at 5-11.

By examining the receiver structure in FIG. 1, it is obvious that the optical amplifier is used to provide a strong optical signal capable of overcoming the effect of thermal noise, and at the same time it is almost in complete synchronism with the received signal. In fact, if the optical amplifier is noiseless and only a small fraction, $\beta$, of the received signal power is fed to the amplifier, the performance of the homodyne DPSK receiver is practically the same as that of a homodyne PSK receiver, with an advantage that there is no need for complicated carrier recovery circuits.

IDEAL PERFORMANCE OF THE DPSK RECEIVER

The instantaneous amplitude of the optical field at the inputs of the two photodetectors PIN photodiodes (shown between 8 and 9, and 7 and 10) in the $k^{th}$ bit interval are $$V_1(t) = \sqrt{2(1-\beta)P_s}\ a_k \cos\omega_0 t + \sqrt{2\beta G P_s}\ a_{k-1}\cos\omega_0 t + \quad (2)$$

$$n_{ac}(t)\cos\omega_0 t - n_{as}(t)\sin\omega_0 t$$

$$V_2(t) = \sqrt{2(1-\beta)P_s}\ a_k \cos\omega_0 t - \sqrt{2\beta G P_s}\ a_{k-1}\cos\omega_0 t - \quad (3)$$

$$n_{ac}(t)\cos\omega_0 t + n_{as}(t)\sin\omega_0 t$$

where G is the power gain of the optical amplifier, and $n_{ac}(t)$ and $n_{as}(t)$ are the low-pass inphase and quadrature components of th noise added by the optical amplifier which are zero-mean white Gaussian independent random variables. The noise terms are attributed to spontaneous emission that occurs in the optical amplification process. In Eqs. (2) and (3), it is assumed there is no laser phase noise. Since the optical power is one-half the square of the field envelope, the power signals at the inputs of the photodetectors are $$P_1(t) = (1-\beta G)P_s + 2\sqrt{\beta(1-\beta)G P_s}\ a_k a_{k-1} + \quad (4)$$

$$[\sqrt{2(1-\beta)P_s}\ a_k + \sqrt{2\beta G P_s}\ a_{k-1}] n_{ac}(t) + [n_{ac}^2(t) + n_{as}^2(t)]$$

$$P_2(t) = (1-\beta+\beta G)P_s - 2\sqrt{\beta(1-\beta)G P_s}\ a_k a_{k-1} - \quad (5)$$

$$[\sqrt{2(1-\beta)P_s}\ a_k - \sqrt{\beta G P_s}\ a_{k-1}] n_{ac}(t) + [n_{ac}^2(t) + n_{as}^2(t)]$$

The first term in Eqs. (4) and (5) is a constant power, the second term is the desired data signal and the last three terms are the noise components, due to the optical amplifier. The current at the output of the balanced mixer 11 is the difference between the photocurrents of the two photodetectors $$i(t) = \eta e/h\nu [P_1(t) - P_2(t)] + n_{sh}(t) + n_{th}(t) \quad (6)$$

where $\eta$ represents the quantum efficiency of the photodetectors, e is the electron charge, h is Plank's constant, $\nu$ is the optical carrier frequency, $n_{sh}(t)$ is a shot noise random process and $n_{th}(t)$ is a thermal noise random process.

By substituting Eqs. (4) and (5) in (6), we get $$i(t) = \frac{4\eta e}{h\nu} \sqrt{\beta(1-\beta)G P_s}\ a_k a_{k-1} + \quad (7)$$

$$\frac{2\eta e}{h\nu} \sqrt{2(1-\beta)P_s}\ a_k n_{ac}(t) + n_{sh}(t) + n_{th}(t)$$

It is obvious from Eq. (7) that the balanced mixer receiver removes the last two excess noise terms of the optical amplifier that appeared in Eqs. (4) and (5). This noise suppression capability of the balanced mixer makes its inclusion desirable.

The binary data signal is recovered by passing the photocurrent through an integrate-and-dump circuit followed by a comparator device. When $a_k = a_{k-1}$ (no phase change), the signal component $I_1$, is $$I_1 = \frac{4\eta e}{h\nu} \sqrt{\beta(1-\beta)G P_s} \quad (8)$$

and when $a_k \neq a_{k-1}$ (phase change), the signal component $I_0$ is $$I_0 = -\frac{4\eta e}{h\nu} \sqrt{\beta(1-\beta)G P_s} \quad (9)$$

It is obvious from Eqs. (8) and (9) that the comparator threshold is zero. Therefore if $i(t) > 0$, there is a result of "one" and when $i(t) < 0$, "zero".

Assuming that the three noise components given in Eq. (7) are zero-mean white Gaussian random processes, the conditional probability density function for I is $$P(I|a_k = a_{k-1}) = \frac{1}{\sqrt{2\pi\sigma_n^2}} \exp\left[-\frac{(I-I_1)^2}{2\sigma_n^2}\right] \quad (10)$$

and $$P(I|a_k \neq a_{k-1}) = \frac{1}{\sqrt{2\pi\sigma_n^2}} \exp\left[-\frac{(I-I_0)^2}{2\sigma_n^2}\right] \quad (11)$$

where $\sigma_n^2$ is the total noise variance which is the sum of the variances of the thermal, shot, and optical amplifier noises, assuming that they are statistically independent. The thermal noise variance at the sampling time is $$\sigma_{th}^2 2 KT_o/R_L \cdot 2W \tag{12}$$

where K is Boltzmann's constant, $T_o$ is room temperature in Kelvin, $R_L$ is the photodetector load resistance and W is the signal bandwidth.

The shot noise variance is proportional to the d.c. current components of the photodetector current which is large compared to the signal component $$\sigma_{sh}^2 = 72\, e^2/h\nu \cdot 2(1 - \beta + \beta G)P_s \cdot 2W \tag{13}$$

The variance of the optical amplifier noise is $$\sigma_a^2 = \left(\frac{\eta e}{h\nu}\right)^2 4(1 - \beta)P_s \frac{n_{sp}}{\eta_a}(G - 1)h\nu \cdot 2W \tag{14}$$

where $n_{sp}$ is the spontaneous emission factor and $\eta_a$ is the quantum efficiency of the amplifier. Therefore, the total noise variance $\sigma_n^2$ is $$\sigma_n^2 = \tag{15}$$

$$\left(\frac{\eta e}{h\nu}\right) 8Wh\nu P_s \left[(1 - \beta)(G - 1)\frac{n_{sp}}{\eta_a} + \frac{1 - \beta + \beta G}{2\eta} + \frac{KT_o h\nu}{2R_L \eta^2 e^2 P_s}\right]$$

Assuming equal probabilities of 0 and 1 binary transmission, the average bit error probability is $$P_e = \tfrac{1}{2}P(e/a_k = a_{k-1}) + \tfrac{1}{2}P(e/a_k \neq a_{k-1}) \tag{16}$$

Because of the symmetry of the two conditional PDF's, Eq. (16) becomes $$P_e = \frac{1}{\sqrt{2\pi\sigma_n^2}} \int_{-\infty}^{0} \exp\left[-\frac{(I - I_1)^2}{2\sigma_n^2}\right] dI \tag{17}$$

and it can be reduced to $$P_e = \tfrac{1}{2} erfc\left[\frac{I_1}{\sqrt{2\sigma_n}}\right] \tag{18}$$

where erfc() is the well known complementary error function.

By substituting Eq. (8) and Eq. (15) in Eq. (18), it becomes $$P_e = \tfrac{1}{2} erfc\left[\sqrt{\frac{\beta(1 - \beta)G}{(1 - \beta)(G - 1)n_{sp} + \frac{1 - \beta + \beta G}{2} + \frac{0.0107}{R_L \eta P_s}}} \frac{\eta P_s}{h\nu W}\right] \tag{19}$$

and we assume that $\eta_a = \eta$ for convenience.

Error probability is determined by five parameters; the signal power $P_s$, the photodetector load resistance $R_L$, the gain G, and the spontaneous emission factor $n_{sp}$ of the optical amplifier and $\beta$. From the generalized error probability expression given in Eq. (19), we can derive simple expressions for some special cases.

Ideal Conventional Homodyne DPSK

In an ideal conventional homodyne DPSK, the gain of the optical amplifier reduces to 1 and assuming no thermal noise, the expression in Eq. (19) becomes $$P_e = \tfrac{1}{2} erfc\left[\sqrt{2\beta(1 - \beta)\frac{\eta P_s}{h\nu W}}\right] \tag{20}$$

The value of $\beta$ which minimizes $P_e$ is $\tfrac{1}{2}$, therefore Eq. (20) becomes $$P_e = \tfrac{1}{2} erfc\left[\sqrt{\frac{\eta P_s}{2h\nu W}}\right] \tag{21}$$

Ideal Homodyne PSK

It is possible to achieve the performance of an ideal homodyne PSK by using a noiseless optical amplifier ($n_{sp}=0$) with very high gain. Again, neglecting the thermal noise, and substituting $n_{sp}=0$ in Eq. (19), $$P_e = \tfrac{1}{2} erfc\left[\sqrt{\frac{2\beta(1 - \beta)G}{1 - \beta + \beta G}\frac{\eta P_s}{h\nu W}}\right] \tag{22}$$

For a given gain G, the $\beta$ which minimize the error probability is:

$$\beta_{opt} = \frac{1}{\sqrt{G} + 1} \tag{23}$$

For large values of G, $\beta$ is approximately $1/\sqrt{G}$. By substituting $\beta_{opt}$ in Eq. (22), it becomes $$P_e = \tfrac{1}{2} erfc\left[\sqrt{\frac{2\eta P_s}{h\nu W}}\right] \tag{24}$$

which is the error probability that can be achieved by an ideal homodyne PSK.

In general, the optimum $\beta$ which minimizes the error probability for a given $P_s$, G, $n_{sp}$ and $R_L$ is $$\beta_{opt} = \frac{\sqrt{C}}{\sqrt{C} + \sqrt{G}} \tag{25}$$

where $$C = 2n_{sp}(G-1) + 1 + 0.0214/R_L \eta P_s \tag{26}$$

At this value of $\beta_{opt}$, the minimum error probability is given as $$P_e = \tfrac{1}{2} \text{erfc}\left[\sqrt{\frac{2G}{(\sqrt{C} + \sqrt{G})^2} \frac{\eta P_s}{h\nu W}}\right] \quad (27)$$

For large values of G, Eq. (27) becomes $$P_e = \tfrac{1}{2} \text{erfc}\left[\sqrt{\frac{2}{(\sqrt{2n_{sp}} + 1)^2} \frac{\eta P_s}{h\nu W}}\right] \quad (28)$$

By examining Eq. (26) and Eq. (27) in the absence of thermal noise, it is found that the error probability decreases as the gain increases only when $n_{sp} < 0.5$. When $n_{sp} > 0.5$, the error probability increases as the gain increases. For $n_{sp} = 0.5$, the error probability is independent of the gain and it is given as $$P_e = \tfrac{1}{2} \text{erfc}\left[\sqrt{\frac{\eta P_s}{2h\nu W}}\right] \quad (29)$$

The number of photons per bit needed to obtain a certain error probability, say $10^{-9}$, can be found from Eq. (27). For $P_e = 10^{-9}$, the argument of the erfc( ) should be $\sqrt{18}$, therefore $$\frac{2G}{(\sqrt{C} + \sqrt{G})^2} P_s' = 18 \quad (30)$$

where $P_s' = \eta P/h\nu W$ is the number of photons per bit assuming an ideal photodetector. It is obvious from Eq. (30) and Eq. (26), that for high gain noiseless amplifiers ($n_{sp} = 0$), the number of photons per bit required to achieve an error probability equal to $10^{-9}$ is 9 which is that achieved by an ideal homodyne PSK receiver.

Effect of Laser Phase Noise on Receiver Performance

Because of the present lack of monochromatic optical sources, the performance of coherent lightwave systems is far from ideal. This degradation in performance is due to the presence of phase noise in practical optical sources. It is found that laser phase noise sets a fundamental limit on the performance of such systems. Compared to homodyne PSK and heterodyne DPSK, optical homodyne DPSK is found to be the least sensitive to laser phase noise.

The effect of laser phase noise on homodyne DPSK is introduced into Eq. (27) as $$P_e = \tfrac{1}{2} \text{erfc}[\rho \cos \phi] \quad (31)$$

where $$\rho = \sqrt{\frac{2G}{(\sqrt{C} + \sqrt{G})^2} \frac{\eta P_s}{h\nu W}} \quad (32)$$

and $$\phi = \frac{1}{T} \int_0^T [\rho(t) - \rho(t - T)] dt \quad (33)$$

The average error probability is obtained by averaging Eq. (31) over the probability density function of $\phi$, yielding [6]

$$P_e = \tfrac{1}{2} \int_{-\pi}^{\pi} \text{erfc}[\rho \cos\phi] f(\phi) d\phi \quad (34)$$

where $f(\phi)$ is the probability density function of $\phi$. If $\phi$ has a symmetric distribution around $\phi = 0$, then Eq. (34) becomes $$P_e = \int_0^{\pi} \text{erfc}[\rho \cos\phi] f(\phi) d\phi \quad (35)$$

For $\phi < \pi/2$, $\cos\phi$ is negative, therefore $$\text{erfc}[\rho \cos \phi] = 2 - \text{erfc}[\rho | \cos \phi|] \pi/2 < \phi \leq \pi \quad (36)$$

by substituting Eq. (36) in Eq. (35), we get $$P_e = 2 \int_{\pi/2}^{\pi} f(\phi) d\phi + \int_0^{\pi/2} \text{erfc}(\rho \cos\phi) f(\phi) d\phi - \int_{\pi/2}^{\pi} \text{erfc}(\rho|\cos\phi|) f(\phi) d\phi \quad (37)$$

Since $|\cos\phi| = \cos(\pi - \phi)$ for $\pi/2 < \phi \leq \rho$, Eq. (37) becomes $$P_e = 2 \int_{\pi/2}^{\pi} f(\phi) d\phi + \int_0^{\pi/2} \text{erfc}(\rho\cos\phi) [f(\phi) - f(\pi - \phi)] d\phi \quad (38)$$

If $f(\phi)$ is a monotonic decreasing function of its argument, the second term in Eq. (38) is always positive and a lower bound for $P_e$ is $$P_e \geq 2 \int_{\pi/2}^{\pi} f(\phi) d\phi \quad (39)$$

It is clear from Eq. (39) that the laser phase noise sets a floor for error probability; i.e., the error probability can't go below this floor what ever the received optical signal strength. As an example, if $f(\phi)$ is uniformly distributed over $2\pi$, then the floor error probability is 0.5, while if $f(\phi) = \delta(\phi)$, it is zero.

A good model for the laser phase noise is a zero-mean Gaussian with variance $\sigma_\theta^2 = 2\pi B_L/R$ where $B_L$ is the 3 dB linewidth of the laser and R is the data bit rate. By using this model, the time average phase difference given in Eq. (33) is also zero-mean Gaussian with PDF given as $$f(\phi) = \frac{1}{\sqrt{2\pi\sigma_\phi^2}} \exp\left[-\frac{\phi^2}{2\sigma_\phi^2}\right] \quad (40)$$

where $\sigma_\phi^2 = 4\pi/3 \, B_L/R$. By substituting Eq. (40) in Eq. (39), the floor error probability $P_F$ is given as $$P_F = \text{erfc}\left[\sqrt{\frac{3\pi R}{32 B_L}}\right] \quad (41)$$

It is obvious that the floor error probability is determined by the bit rate-to-laser linewidth ($R/B_L$) ratio; the higher the ratio the lower will be the floor error probability. For a given laser linewidth, the minimum allowable bit rate to achieve a certain error probability $P_e$ can be determined by substituting $P_e$ for $P_F$ in Eq. (41). For example, if $P_e = 10^{-9}$, then the minimum allowable bit rate $R_{min}$ is $67 B_L$ which is the same as that determined by Salz.

The exact error probability can be determined by substituting Eq. (40) in either Eq. (35) or Eq. (38). Using Eq. (35) since a similar expression is also known using expansion techniques, the result is $$P_e = \tfrac{1}{2}\mathrm{erfc}(\rho) + \sum_{m=0}^{\infty}(-1)^m H_m\left(1 - \exp\left[-(2m+1)^2\frac{\sigma_\phi^2}{2}\right]\right) \quad (42)$$

where $$H_m = \frac{\rho \exp\left(\frac{-\rho^2}{2}\right)}{\sqrt{\pi}\,(2m+1)}\left[I_m\left(\frac{\rho^2}{2}\right) + I_{m+1}\left(\frac{\rho^2}{2}\right)\right] \quad (43)$$

where $I_m(X)$ is the modified Bessel function of the first kind and or order m.

NUMERICAL RESULTS

Figure 2:
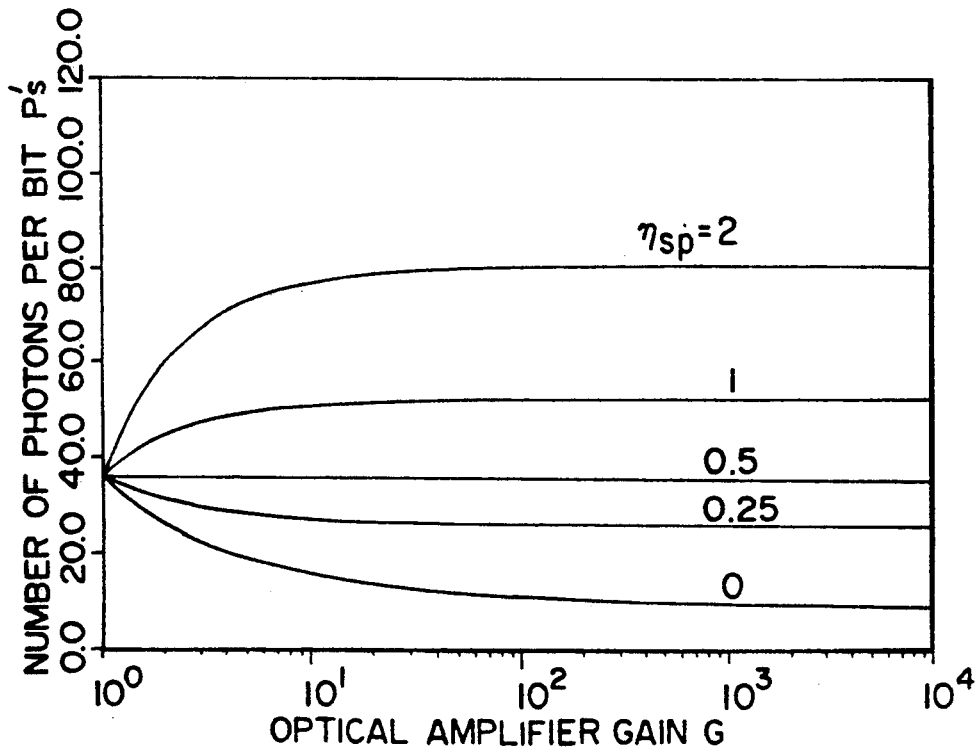
FIG. 2 is a graph plotting photons per bit (P) against optical amplifier gain (G) for several values of spontaneous emission factor ($\eta_{sp}$), assuming no thermal noise $-R_L = \infty$, $P_e = 10^{-9}$.
Figure 3:
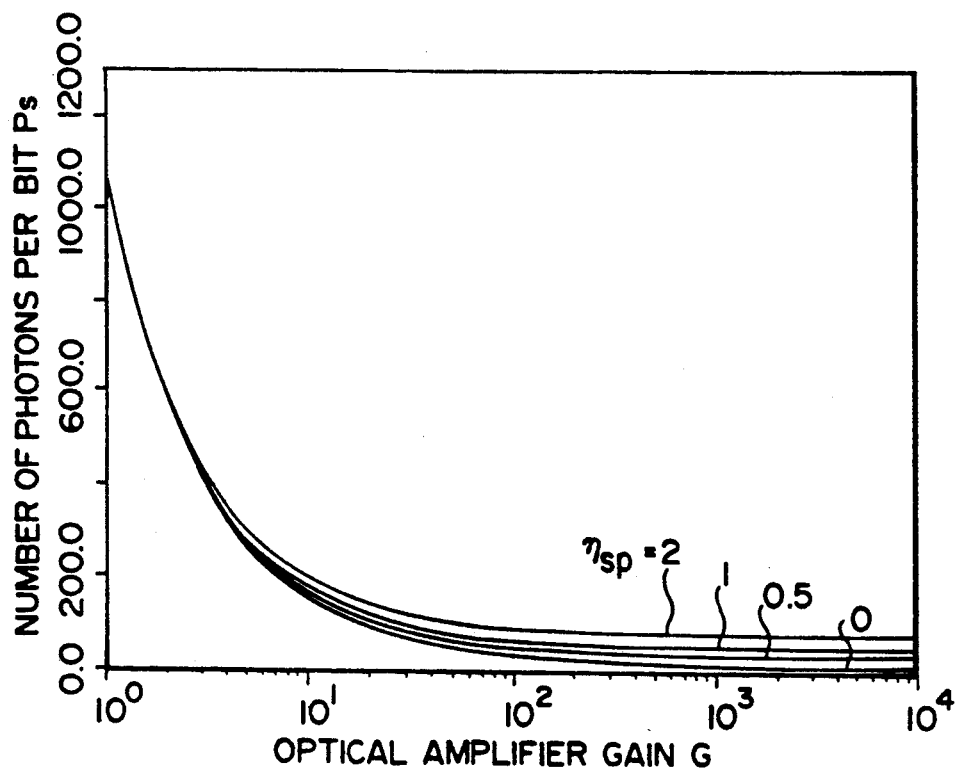
FIG. 3 is the same graph as FIG. 2, but in the presence of thermal noise $-R_L = 1$ k$\Omega$, $P_e = 10^{-9}$.
Figure 4:
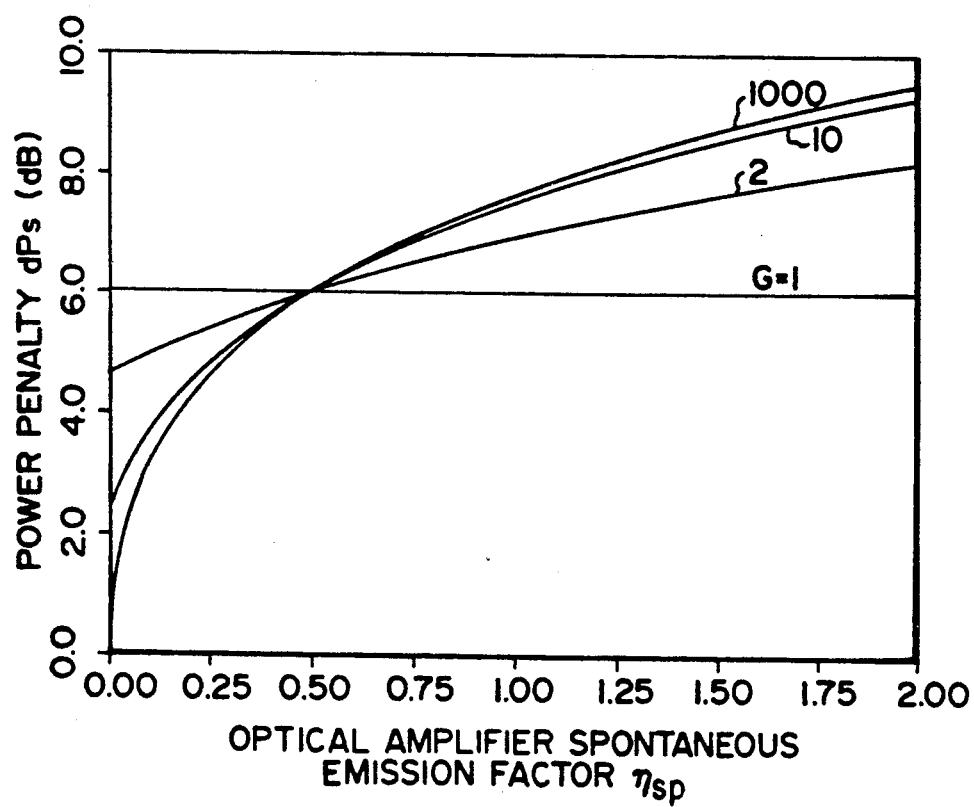
FIG. 4 is a graph of power penalty (in dB) against optical amplifier spontaneous emission factor ($\eta_{sp}$), assuming no thermal noise $-R_L = \infty$, $P_e = 10^{-9}$.
Figure 5:
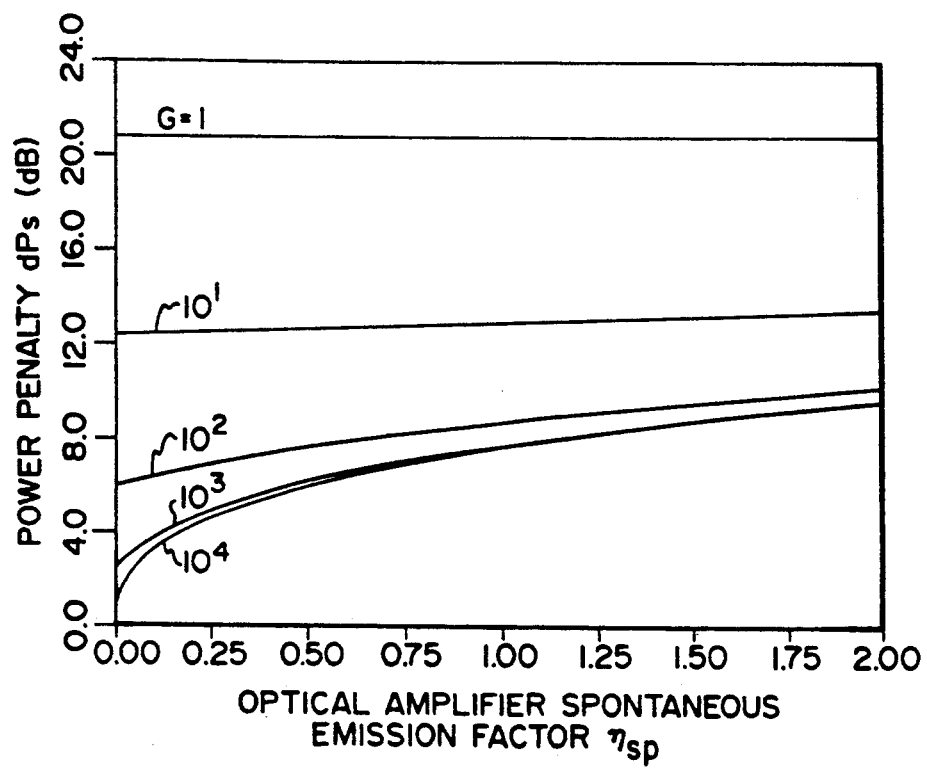
FIG. 5 is the graph of FIG. 4, in the presence of thermal noise $-R_L = 1$ k$\Omega$, $P_e = 10^{-9}$.

The performance of the present invention in the absence of laser phase noise can be studied using Eq. (27) which gives the average error probability as a function of different receiver parameters; the received optical energy $P/_s = \eta P_s/h\nu W$ in photon per bit, the optical amplifier gain G, the optical amplifier spontaneous emission factor $n_{sp}$ and the photodetector load resistance $R_L$. In Eq. (27), the fraction of the received optical signal $\beta$ which goes to the optical amplifier is assumed to be optimum as given in Eq. (25). The effect of each of the above mentioned receiver parameters on the system performance is determined. FIG. 2 shows the number of photons per bit needed to obtain an average error probability of $10^{-9}$ as a function of optical amplifier gain for different values of optical amplifier spontaneous emission factor $n_{sp}$, neglecting the effect of thermal noise. When the gain is one i.e. no optical amplifier, the number of photons per bit needed might increase or decrease depending on whether $n_{sp}$ is greater than 0.5 or less than 0.5 respectively. For $n_{sp}$ equal to 0.5, the number of photons per bit needed is independent of the gain. For $n_{sp} = 0$ i.e. an optical amplifier without noise, the performance of the proposed homodyne DPSK approaches that of ideal homodyne PSK at large values of amplifier gain. FIG. 4 shows the power penalty in dB as a function of spontaneous emission factor for different values of gain. For values of $n_{sp}$ less than 0.5, the penalty ranges from 0 to 6 dB's. For $n_{sp}$ greater than 0.5, the penalty is greater than 6 dB. The effect of thermal noise on the system performance can be seen by redrawing FIGS. 2 and 4 in the presence of thermal noise as shown in FIGS. 3 and 5. It is obvious that at $G = 1$, which is the case of conventional optical DPSK, the performance is very poor and is comparable to that of direct detection systems. By increasing the optical amplifier gain, the system performance starts to improve.

Figure 6:
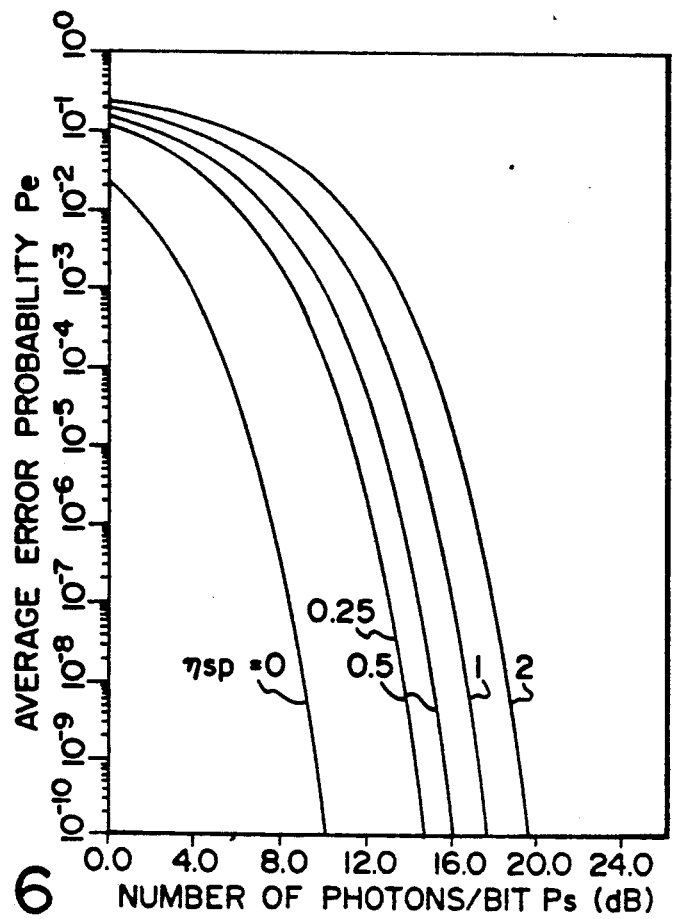
FIG. 6 is a graph of average error probability ($P_e$) against number of photons per bit in dB for several values of spontaneous emission factor, at $G - 10^5$, $R_L = \infty$.
Figure 7:
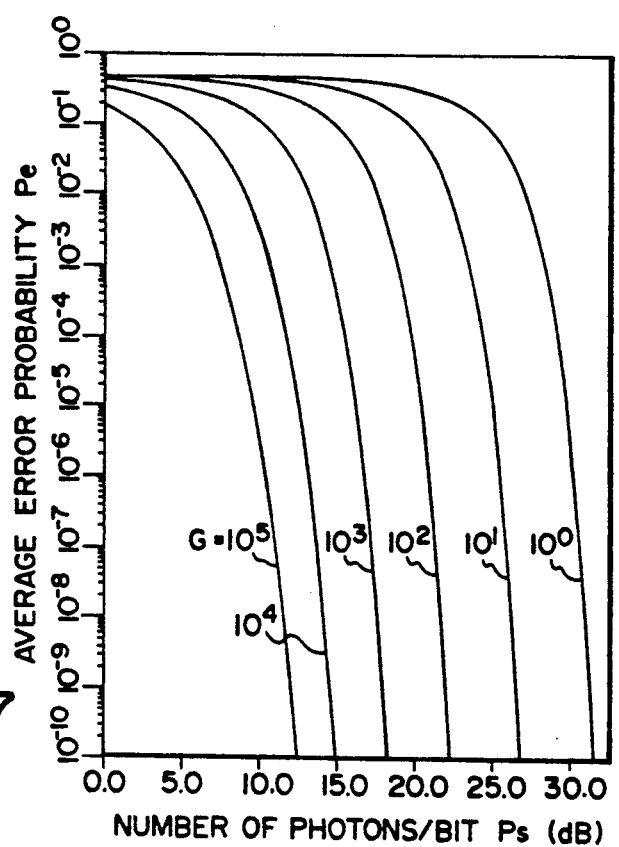
FIG. 7 is the same graph as FIG. 6, but at several values of amplifier gain (G), at $n_{sp} = 0$, $R_L = 1$ k$\Omega$.

The average error probability versus received optical energy in photons per bit (dB) for different values of spontaneous emission factor $n_{sp}$ and in the absence of thermal noise is shown in FIG. 6. In FIG. 7, the average error probability is shown as a function of received optical energy for different values of optical amplifier gains in the presence of thermal noise. It is obvious that conventional optical DPSK performs badly in the presence of thermal noise. The degradation is about 2 dB from the quantum limit at $P_e = 10^{-9}$.

Figure 8:
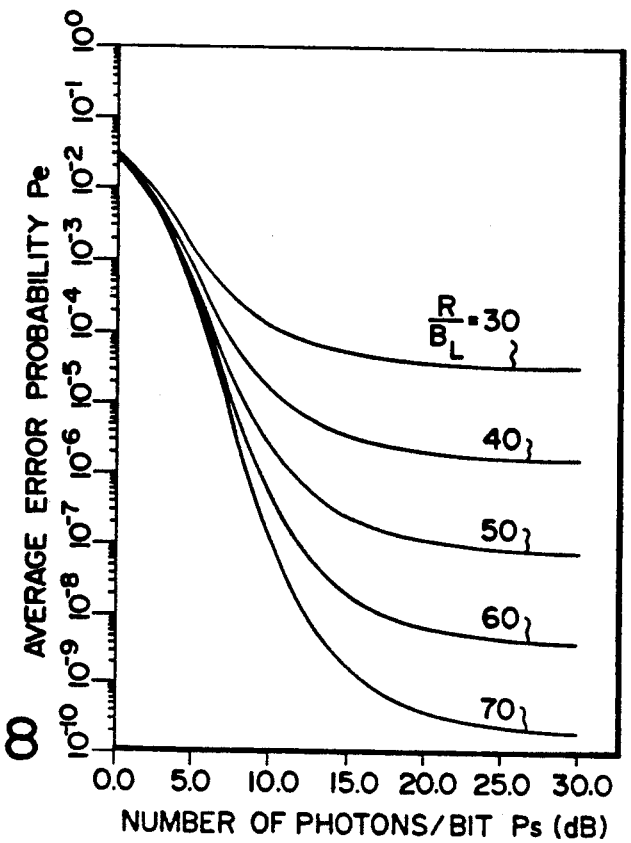
FIG. 8 is the same graph as FIG. 6, but at several values of a bit rate to linewidth ratio (R/B$_L$), at G = $10^5$, $n_{sp} = 0$.

The effect of laser phase noise on the present DPSK system is the same as that of conventional optical DPSK system. FIG. 8 shows the average error probability as a function of received optical energy for different values of bit rate-to-linewidth ratios ($R/B_L$) in the absence of thermal noise. It is obvious that for each $R/B_L$ ratio, there is a floor below which the error probability can't go. The degradation in performance due to laser phase noise can be found by comparing the results of FIGS. 6 and 8. As an example, if $P_e = 10^{-9}$, then $R/B_L$ must be greater than 67 [from Eq. (41)], for instance 70, and in this case the degradation is about 7 dB. For values of $R/B_L$ less than 67, this error probability cannot be achieved. In general, the degradation due to laser phase noise can be reduced to any degree by increasing the bit rate-to-linewidth ratio.

It is to be understood that the examples described above are not meant to limit the scope of the present invention. It is expected that numerous variants will be obvious to the person skilled in the field of optical receiver design, without any departure from the spirit of the present invention. The appended claims, properly construed, form the only limitation upon the scope of the present invention.

We claim:

1. An optical homodyne differential phase shift keying receiver for receiving and demodulating optical signals, comprising:
   input means for receiving an optical signal;
   power splitting means for splitting said received optical signal into first and second signals, said first and second signals being transmitted away from said power splitting means on respective first and second optical paths;
   delay means in the second optical path for delaying said second signal to thereby produce a delayed second signal;
   optical amplifying means for receiving said delayed second signal and optically amplifying said delayed second signal to thereby produce a delayed amplified second signal; and
   balanced noise reduction circuit means for receiving said delayed amplified second signal from the optical amplifying means and said first signal from said power splitting means, and for combining said first signal and said delayed amplified second signal to produce a demodulated output signal.

2. The receiver of claim 1, wherein said delayed second signal is delayed by one bit period by said delay means.

3. The receiver of claim 2, wherein said power splitting means splits said received optical signal into first and second signals such that the power of said second signal is less than or equal to the power of said first signal.

4. The receiver of claim 3, wherein said power splitting means produces said second signal so that said second signal contains less than fifty percent of the received optical signal power.

5. The receiver of claim 4, wherein said balanced noise reduction circuit means comprises:
   first combining means for adding half of the power of said delayed amplified second signal to half of the power of said first signal to thereby produce a first combined optical signal;
   first photodetector means for converting said first combined optical signal into a first combined electrical signal;
   second combining means for subtracting half of the power of said delayed amplified second signal from half of the power of said first signal to thereby produce a second combined optical signal;
   second photodetector means for converting said second combined optical signal into a second combined electrical signal; and
   third combining means for subtracting said second combined electrical signal from said first combined electrical signal to produce said demodulated output signal.

6. The receiver of claim 1, wherein said power splitting means splits said received optical signal into first and second signals such that the power of said second signal is less than or equal to the power of said first signal.

7. The receiver of claim 6, wherein said power splitting means produces said second signal so that said second signal contains less than fifty percent of the received optical signal power.

8. The receiver of claim 7, wherein said balanced noise reduction circuit means comprises:
   first combining means for adding half of the power of said delayed amplified second signal to half of the power of said first signal to thereby produce a first combined optical signal;
   first photodetector means for converting said first combined optical signal into a first combined electrical signal;
   second combining means for subtracting half of the power of said delayed amplified second signal from half of the power of said first signal to thereby produce a second combined optical signal;
   second photodetector means for converting said second combined optical signal into a second combined electrical signal; and
   third combining means for subtracting said second combined electrical signal from said first combined electrical signal to produce said demodulated output signal.

9. The receiver of claim 1, wherein said balanced noise reduction circuit means comprises:
   first combining means for adding half of the power of said delayed amplified second signal to half of the power of said first signal to thereby produce a first combined optical signal;
   first photodetector means for converting said first combined optical signal into a first combined electrical signal;
   second combining means for subtracting half of the power of said delayed amplified second signal from half of the power of said first signal to thereby produce a second combined optical signal;
   second photodetector means for converting said second combined optical signal into a second combined electrical signal; and
   third combining means for subtracting said second combined electrical signal from said first combined electrical signal to produce said demodulated output signal.

10. The receiver of claim 9, wherein said first and second photodetector means comprise PIN photodiodes.

11. The receiver of claim 10, wherein said optical amplifying means has a gain greater than or equal to one.

12. The receiver of claim 11, wherein said delayed second signal is delayed by one bit period by said delay means.

13. The receiver of claim 12, wherein said power splitting means splits said received optical signal into first and second signals such that the power of said second signal is less than the power of said first signal, and the power of said second signal is less than fifty percent of the received optical signal power.

14. An optical homodyne differential phase shift keying receiver for receiving and demodulating optical signals, includes:
   input means for receiving an optical signal and transmitting said signal to a power splitting means for splitting said signal into first and second signals, each of which is transmitted away from said power splitting means along a respective optical path;
   delay means in the path of said second signal, for delaying said second signal to thereby produce a delayed second signal;
   optical amplifying means in the path of said delayed second signal, for optically amplifying said delayed second signal; and
   balanced noise reduction circuit means receiving inputs from the paths of both said first signal and said delayed amplified second signal, for combining said first signal and said delayed amplified second signal to produce a demodulated output signal.

15. The receiver of claim 14, wherein said delayed second signal is delayed by one bit period.

16. The receiver of claim 15, wherein said delayed second signal is first delayed by said delay means, and then optically amplified by said optical amplifying means prior to combining said delayed amplified second signal with said first signal.

17. The receiver of claim 16, wherein said balanced noise reduction circuit means is positioned to receive the first signal directly and the delayed amplified second signal from said optical amplifying means.

18. The receiver of claim 17, wherein said balanced noise reduction circuit means splits said first signal and said delayed second optically amplified signal into parts, and photodetects the respective signal parts with photodetection means.

19. The receiver of claim 18, wherein the balanced noise reduction circuit means combines respective parts of said first signal with respective parts of said delayed second optically amplified signal in respective first and second combination means, to obtain a substantially noise-free photocurrent.

20. The receiver of claim 19, wherein said input signal is split by said power splitting means into first and second signals, the power of said second signal being less than or equal to the power of said first signal.

* * * * *